United States Patent

Yokotani et al.

Patent Number: 4,751,209
Date of Patent: Jun. 14, 1988

[54] DIELECTRIC CERAMIC COMPOSITIONS

[75] Inventors: Yoichirou Yokotani, Ibaragi; Junichi Kato, Osaka; Hiromu Ouchi, Toyonaka, all of Japan

[73] Assignee: Matsushita Electric Industrial Co., Ltd., Osaka, Japan

[21] Appl. No.: 917,673

[22] Filed: Oct. 10, 1986

[30] Foreign Application Priority Data

| Oct. 11, 1985 | [JP] | Japan | 60-227109 |
| Oct. 11, 1985 | [JP] | Japan | 60-227112 |
| Oct. 18, 1985 | [JP] | Japan | 60-233645 |
| Nov. 5, 1985 | [JP] | Japan | 60-247433 |

[51] Int. Cl.$^4$ ............................................. C04B 35/46
[52] U.S. Cl. ..................................... 501/138; 501/136; 501/139
[58] Field of Search ............... 501/134, 135, 136, 137, 501/138, 139

[56] References Cited

U.S. PATENT DOCUMENTS

| 4,115,493 | 9/1978 | Sakabe et al. | 501/137 X |
| 4,450,240 | 5/1984 | Miyamoto et al. | 501/136 OR |

FOREIGN PATENT DOCUMENTS

| 0012583 | 6/1980 | European Pat. Off. | 501/135 |
| 0051759 | 4/1980 | Japan | 501/135 |
| 0051665 | 3/1985 | Japan | 501/136 |
| 0049501 | 3/1985 | Japan | 501/136 |
| 0151272 | 8/1985 | Japan | 501/135 |
| 1136953 | 6/1986 | Japan | 501/136 |
| 1136952 | 6/1986 | Japan | 501/136 |
| 1155246 | 7/1986 | Japan | 501/134 |
| 1155248 | 7/1986 | Japan | 501/134 |
| 1155247 | 7/1986 | Japan | 501/134 |
| 1155249 | 7/1986 | Japan | 501/134 |

Primary Examiner—Mark L. Bell
Assistant Examiner—Karl Group
Attorney, Agent, or Firm—Wenderoth, Lind & Ponack

[57] ABSTRACT

Dielectric ceramic composition consisting essentially of substance selected from those represented by the following formulas:

(1) $Pb_a(Mg_{\frac{1}{3}}Nb_{\frac{2}{3}})_xTi_y(Ni_{\frac{1}{2}}W_{\frac{1}{2}})_zO_{2+a}$
(2) $Pb_aCa_b(Mg_{\frac{1}{3}}Nb_{\frac{2}{3}})_xTi_y(Ni_{\frac{1}{2}}W_{\frac{1}{2}})_zO_{2+a+b}$
(3) $Pb_aBa_b(Mg_{\frac{1}{3}}Nb_{\frac{2}{3}})_xTi_y(Ni_{\frac{1}{2}}W_{\frac{1}{2}})_zO_{2+a+b}$
(4) $Pb_aSr_b(Mg_{\frac{1}{3}}Nb_{\frac{2}{3}})_xTi_y(Ni_{\frac{1}{2}}W_{\frac{1}{2}})_zO_{2+a+b}$ wherein $x+y+z=1.00$, and a or $a+b \geq 1.001$.

These compositions can be sintered below 1080° C. in low partial pressure of oxygen of about $1 \times 10^{-8}$, and exhibit a high dielectric constant and a high electrical resistivity.

4 Claims, 2 Drawing Sheets

DIELECTRIC CERAMIC COMPOSITIONS

BACKGROUND OF THE INVENTION

The present invention relates to dielectric ceramic compositions allowing sintering at low temperature and at low partial pressure of oxygen, and exhibiting a high dielectric constant, high electrical resistivity, low temperature coefficient of the dielectric constant, and low dielectric loss, whereby they are suitable for use as dielectric material for fabricating multi-layer ceramic capacitors having copper metal internal electrodes.

Recently, multi-layer ceramic capacitors have been used widely in electrical circuits of various electrical products, because such capacitance are small and have large capasitance and high reliability.

In general, multi-layer ceramic capacitors especially exhibiting large capacitance have been manufactured by cofiring barium titanate based ceramics as dielectric materials and internal electrode metals in an oxidizing atmosphere at a temperature above 1200° C. However, firing under these conditions necessitates a highly expensive internal electrode metal such as platinum or palladium, because the electrode material used in such a system must not melt and must not be oxidized in the atmosphere at the firing temperature.

Therefore there have still been two demands for dielectric ceramic materials. One demand is to be able to be sintered at a temperature below 1100° C. for enabling the use of relatively cheap metals such as silver-30% palladium for internal electrodes. The other demand is to be able to be sintered in reducing atmospheres and exhibit high specific resistivity for enabling the use of base metals such as nickel or copper.

U.S. Pat. No. 4,115,493 discloses non-reducing dielectric ceramic compositions of $[(Ba_{1-x}Ca_x)O]_m(Ti_{1-y}Zr_y)O_2$, which can be sintered at a temperature range of 1300° C. to 1400° C. in an atmosphere of low partial pressure of oxygen, and which exhibit a high electrical resistivity. Since sintering temperature of this system is above 1100° C., nickel metal can be used for an internal electrode in the multi-layer ceramic capacitors employing this composition as dielectric materials, but copper metal cannot be used for that. The electrical conductivity of nickel metal is lower than copper, silver, platinum and palladium, so that when nickel metal is employed as internal electrode, loss factor of the capacitor becomes large especially in high frequency.

U.S. Pat. No. 4,450,240 discloses low temperature sintering ceramic compositions of $PbTiO_3$-$Pb(Ni_{\frac{1}{3}}Nb_{\frac{2}{3}})O_3$-$Pb(Mg_{\frac{1}{2}}W_{\frac{1}{2}})O_3$, which can be sintered at a temperature range of 900° C. to 1050° C. in an oxidizing atmosphere. This patent teaches that some complex perovskite compositions containing lead can be sintered at low temperature below 1100° C., and exhibit a high dielectric constant and a high electrical resistivity.

Although silver or silver-palladium metals can be used for internal electrodes in the multi-layer ceramic capacitors employing this composition as dielectric materials, copper metal cannot be used, because this composition can not be sintered in a reducing atmosphere.

SUMMARY OF THE INVENTION

The object of the present invention is to provide a dielectric ceramic composition which can be sintered at a temperature below 1080° C. and in low partial pressure of oxygen, and exhibits a high dielectric constant and a high specific resistivity.

To attain this object, a dielectric ceramic composition according to the present invention essentially consists of a substance selected from those represented by the following formulas:

(1) $Pb_a(Mg_{\frac{1}{3}}Nb_{\frac{2}{3}})_xTi_y(Ni_{\frac{1}{2}}W_{\frac{1}{2}})_zO_{2+a}$
(2) $Pb_aCa_b(Mg_{\frac{1}{3}}Nb_{\frac{2}{3}})_xTi_y(Ni_{\frac{1}{2}}W_{\frac{1}{2}})_zO_{2+a+b}$
(3) $Pb_aBa_b(Mg_{\frac{1}{3}}Nb_{\frac{2}{3}})_xTi_y(Ni_{\frac{1}{2}}W_{\frac{1}{2}})_zO_{2+a+b}$
(4) $Pb_aSr_b(Mg_{\frac{1}{3}}Nb_{\frac{2}{3}})_xTi_y(Ni_{\frac{1}{2}}W_{\frac{1}{2}})_zO_{2+a+b}$ wherein subscripts a, b, x, y and z represent molar fractions of the respective components, $x+y+z=1.00$, and a or $a+b \geqq 1.001$.

These novel composition of the present invention can be sintered below 1080° C. in low partial pressure of oxygen about $1\times10^{-8}$, and have a high dielectric constant and further have a high electrical resistivity.

DETAILED DESCRIPTION OF THE INVENTION

Figure 1:
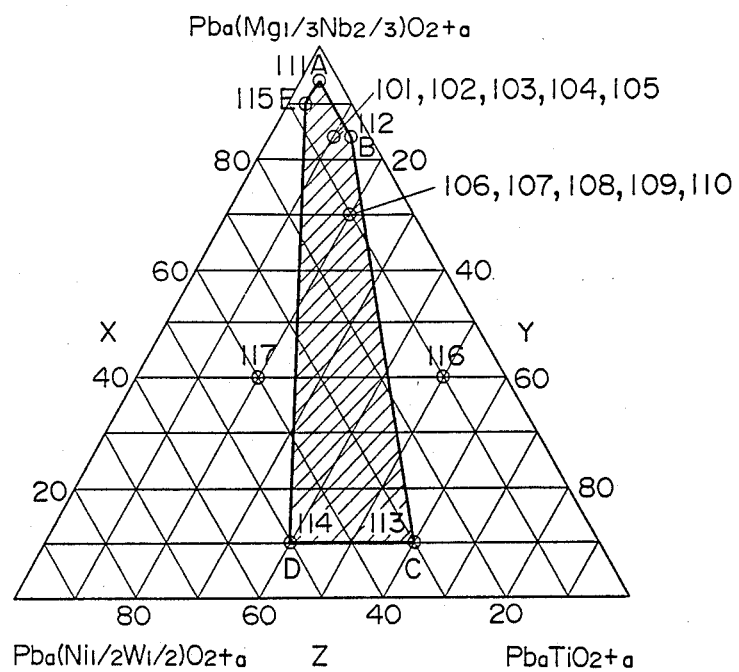
FIG. 1 is a composition diagram of $Pb_aTiO_{2+a}$-$Pb_a(Mg_{\frac{1}{3}}\text{-}Nb_{\frac{2}{3}})O_{2+a}$-$Pb_a(Ni_{\frac{1}{2}}/W_{\frac{1}{2}})O_{2+a}$ ternary system composition in accordance with the present invention.

The composition herein may be prepared in accordance with various well-known ceramic procedures.

EXAMPLE 1

The starting materials, viz. lead oxide (PbO), titanium oxide ($TiO_2$), niobium oxide ($Nb_2O_5$), magnesium oxide (MgO), nickel oxide (NiO), and tungsten oxide ($WO_3$), all relatively pure grade, were initially mixed in a ball mill with distilled water and agate balls for 17 hours. Thereafter the mixture was dried and then pressed into columns, and calcined at a temperature in the range of 750° C. to 880° C. for 2 hours in an aluminum crucible. The substance thus obtained was wet ground in a ball mill, dried, mixed with polyvinyl alcohol as a binder solution, and then pressed into disks of about 13 mm in diameter and about 0.8 mm in thickness at a pressure of 1000 $Kg/cm^2$, and then the binder was burned out at about 700° C. in air.

The burned out disks were put into a magnesia crucible. Initially about $\frac{1}{3}$ of volume fraction of this crucible was filled with calcined powder as mentioned above, at the bottom of the crucible, and coarse zirconia powder was laid upon the calcined powder with about 1 mm thickness. The burned out disks were put upon the coarse zirconia layer. Then a magnesia cover was put on the crucible. This crucible containing specimens was inserted into an aluminum tube in a furnace. After the air in the aluminum tube was exhausted by a rotary pump, $N_2$—$H_2$—$H_2O$ mixture gas was flowed into the tubes. The partial pressure of $H_2O$ in an initial mixture gas was $3.2\times10^{-3}$ atm, and the partial pressure of $H_2$ in an initial mixture gas was $2.2\times10^{-4}$ atm, and the partial pressure of $O_2$ in a initial mixture gas was $1.0\times10^{-4}$ atm.

The specimens were sintered at a temperature in the range of 850° C. to 1100° C. for 2 hours. The partial pressure of oxygen of the atmosphere in the sintering process was measured with yttrium oxide stabilized zirconia $O_2$ sensor which was inserted on to the magnesia crucible in the aluminium tube. The partial pressure of oxygen of the atmosphere at the sintering temperature was $1.0\times10^{-8}$ to $1.0\times10^{-12}$ atm, which was decreased in accordance with lowering of the sintering temperature.

The sintered bodies were measured for densities. The sintering temperature is selected so that the density of the sintered disks becomes maximum. After measuring the densities Cr-Au electrodes were attached on both surfaces of the disks by a method of vacuum evaporation.

Various properties of the ceramic disks thus obtained are shown in TABLE 1. The dielectric constant ($\epsilon$) and the dielectric loss (tan $\delta$) were measured at a frequency of 1 KHz and a voltage of 1 V at 20° C. The temperature coefficients of the dielectric constants were obtained by measuring the dielectric constants at temperatures in the range of $-25°$ C. to 85° C. and calculating the dielectric constant at 20° C. The electrical resistivity is measured at 20° C. under application of a D.C voltage of 1000 V.

From TABLE 1 it is obvious that ceramic compositions which fall within the polygon ABCDE in the ternary system composition diagram of FIG. 1 and in which $1.001\leq a\leq 1.110$ provide a high dielectric constant ($\epsilon=21,350$ to 7520), high electrical resistivity up to $1.0\times10^{11}$ $\Omega$.cm, low dielectric loss, low temperature coefficient of the dielectric constant, and can be sintered below 1080° C.

A, B, C, D and E of FIG. 1 are represented by the values of x, y, and z as follows:

|   | x | y | z |
|---|---|---|---|
| A: | 0.950 | 0.025 | 0.025 |
| B: | 0.850 | 0.125 | 0.025 |
| C: | 0.100 | 0.600 | 0.300 |
| D: | 0.100 | 0.400 | 0.500 |
| E: | 0.900 | 0.025 | 0.075 |

The reasons for the limitations of values in TABLE 1 and value $<a>$ are as follows:

In case of the compositions wherein proportions x, y and z are out of the polygon ABCDE such as sample Nos. 116 and 117, the dielectric constant is lower than 3500 and the temperature coefficient of the dielectric constant is large. In case of the compositions wherein a is smaller than 1.001 such as samples Nos. 101 and 106, the electrical resistivity is lower than $1.0\times10^{10}$ $\Omega$.cm. In case of the compositions wherein a is larger than 1.110 such as sample Nos. 105 and 110, the dielectric loss are increased.

EXAMPLE 2

The starting materials, viz. lead oxide (PbO), titanium oxide ($TiO_2$), niobium oxide ($Nb_2O_5$), magnesium oxide (MgO), nickel oxide (NiO), tungsten oxide ($WO_3$), and calcium carbonate ($CaCO_3$), all relatively pure grade, were initially mixed in a ball mill with distilled water and calcium oxide stabilised zirconia balls for 17 hours. The following powder process, sintered process and measuring of properties of sintering body were the same as those in Example 1.

Various properties of the ceramic disks thus obtained are shown in TABLE 2.

Figure 2:
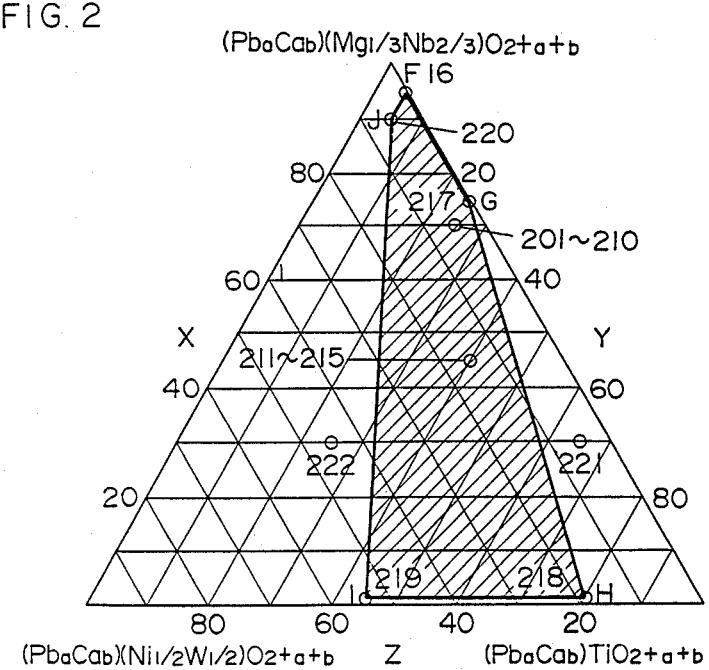
FIG. 2 is a composition diagram of $Pb_aCa_bTiO_{2+a+b}$-$Pb_aCa_b$-$(Mg_{\frac{1}{3}}Nb_{\frac{2}{3}})O_{2+a+b}$-$Pb_aCa_b$-$(Ni_{\frac{1}{2}}W_{\frac{1}{2}})O_{2+a+b}$ ternary system composition in accordance with the present invention.

From TABLE 2 it is obvious that ceramic compositions which fall within the polygon FGHIJ in the ternary system composition diagram of FIG. 2 and in which $0.001\leq b\leq 0.225$ and $1.001\leq a+b\leq 1.225$ provide a high dielectric constant ($\epsilon=21540$ to 4030), high electrical resistivity up to $1.0\times10^{10}$ $\Omega$.cm, low dielectric loss, low temperature coefficient of the dielectric

TABLE 1

| No. | Composition a | x | y | z | Sintering temperature (°C.) | $\epsilon$ (20° C.) | Change of $\epsilon$ ($-25°$ C.) % | Change of $\epsilon$ (85° C.) % | tan $\delta$ (20° C.) $\times 10^{-4}$ | Specific resistivity (20° C.) $\Omega\cdot$cm | Density g/cm$^3$ |
|---|---|---|---|---|---|---|---|---|---|---|---|
| 101* | 1.000 | 0.850 | 0.100 | 0.050 | 1080 | 16860 | −45.2 | −61.8 | 266 | $1.0\times10^{+9}$ | 7.653 |
| 102 | 1.001 | 0.850 | 0.100 | 0.050 | 1020 | 16980 | −44.9 | −61.0 | 112 | $1.5\times10^{+11}$ | 7.998 |
| 103 | 1.025 | 0.850 | 0.100 | 0.050 | 950 | 15870 | −44.6 | −60.8 | 56 | $2.6\times10^{+12}$ | 8.153 |
| 104 | 1.110 | 0.850 | 0.100 | 0.050 | 860 | 10690 | −40.8 | −54.6 | 102 | $1.0\times10^{+12}$ | 8.223 |
| 105* | 1.180 | 0.850 | 0.100 | 0.050 | 830 | 6830 | −39.5 | −42.3 | 305 | $8.5\times10^{+11}$ | 8.159 |
| 106* | 1.000 | 0.700 | 0.200 | 0.100 | 1050 | 20390 | −60.0 | −54.0 | 622 | $7.5\times10^{+9}$ | 7.865 |
| 107 | 1.001 | 0.700 | 0.200 | 0.100 | 1020 | 21340 | −60.0 | −53.4 | 422 | $5.0\times10^{+11}$ | 7.963 |
| 108 | 1.025 | 0.700 | 0.200 | 0.100 | 920 | 20630 | −60.0 | −52.6 | 432 | $1.6\times10^{+12}$ | 8.122 |
| 109 | 1.110 | 0.700 | 0.200 | 0.100 | 890 | 15630 | −58.4 | −50.2 | 622 | $4.5\times10^{+11}$ | 8.103 |
| 110* | 1.180 | 0.700 | 0.200 | 0.100 | 820 | 6230 | −45.3 | −40.6 | 553 | $2.6\times10^{+9}$ | 8.096 |
| 111 | 1.025 | 0.950 | 0.025 | 0.025 | 1020 | 10520 | −5.2 | −34.0 | 358 | $5.2\times10^{+11}$ | 8.169 |
| 112 | 1.025 | 0.850 | 0.125 | 0.025 | 1020 | 16090 | −65.4 | −26.3 | 420 | $5.0\times10^{+11}$ | 8.115 |
| 113 | 1.025 | 0.100 | 0.600 | 0.300 | 880 | 7860 | −32.6 | −51.3 | 265 | $1.5\times10^{+11}$ | 8.065 |
| 114 | 1.025 | 0.100 | 0.400 | 0.500 | 860 | 7520 | +8.6 | −60.3 | 24 | $2.5\times10^{+11}$ | 8.066 |
| 115 | 1.025 | 0.900 | 0.025 | 0.075 | 950 | 10890 | −10.6 | −60.2 | 36 | $1.0\times10^{+11}$ | 8.104 |
| 116* | 1.025 | 0.400 | 0.500 | 0.100 | 900 | 3220 | −82.5 | +40.2 | 558 | $1.0\times10^{+11}$ | 8.100 |
| 117* | 1.025 | 0.400 | 0.200 | 0.400 | 820 | 2150 | +25.3 | −50.3 | 123 | $1.0\times10^{+11}$ | 8.114 |

(1) Basic compositions: $Pb_a(Mg_{\frac{1}{3}}Nb_{\frac{2}{3}})_xTi_y(Ni_{\frac{1}{2}}W_{\frac{1}{2}})_zO_{2+a}$
(2) Compositions of the Nos. with asterisk (*) are outside of the scope of the present invention.

constant, and can be sintered below 1080° C.

F, G, H, I and J of FIG. 2 are represented by the values of x, y and z as follows:

|   | x | y | z |
|---|---|---|---|
| F: | 0.950 | 0.049 | 0.001 |
| G: | 0.750 | 0.249 | 0.001 |

-continued

| | x | y | z |
|---|---|---|---|
| H: | 0.010 | 0.800 | 0.190 |
| I: | 0.010 | 0.450 | 0.540 |
| J: | 0.900 | 0.050 | 0.050 | sition wherein b is larger than 0.225 and a+b is larger than 1.250 such as sample No. 205, 208, 210, 215, the dielectric constants is decreased or dielectric loss are increased.

EXAMPLE 3

The starting materials, viz. lead oxide (PbO), titanium oxide ($TiO_2$), niobium oxide ($Nb_2O_5$), magnesium oxide (MgO), and nickel oxide (NiO) were initially mixed in a ball mill with distilled water and calcium oxide stabilised zirconia balls for 17 hours. The following power process, sintering process and measuring of properties of sintering body were the same as those in Example 1.

Various properties of the ceramic disks thus obtained are shown in Table 3.

TABLE 2

| No. | Composition a | b | x | y | z | Sintering temperature (°C.) | ε (20° C.) | Change of ε (−25° C.) % | Change of ε (85° C.) % | tan δ (20° C.) × $10^{-4}$ | Specific resistivity (20° C.) Ω·cm | Density g/cm³ |
|---|---|---|---|---|---|---|---|---|---|---|---|---|
| 201* | 1.000 | 0.000 | 0.700 | 0.250 | 0.050 | 1120 | 15390 | −72.6 | −50.1 | 412 | $1.5 \times 10^{+9}$ | 7.661 |
| 202 | 1.000 | 0.001 | 0.700 | 0.250 | 0.050 | 1050 | 16320 | −70.2 | −50.1 | 442 | $2.0 \times 10^{+11}$ | 7.891 |
| 203 | 1.000 | 0.025 | 0.700 | 0.250 | 0.050 | 980 | 21540 | −52.3 | −58.6 | 215 | $8.0 \times 10^{+13}$ | 8.112 |
| 204 | 1.000 | 0.225 | 0.700 | 0.250 | 0.050 | 920 | 14260 | −23.5 | −65.3 | 42 | $1.5 \times 10^{+13}$ | 8.023 |
| 205* | 1.000 | 0.400 | 0.700 | 0.250 | 0.050 | 950 | 8500 | +10.3 | −48.6 | 125 | $4.5 \times 10^{+12}$ | 7.756 |
| 206* | 0.950 | 0.030 | 0.700 | 0.250 | 0.050 | 1150 | 15230 | −58.6 | −47.6 | 321 | $5.5 \times 10^{+9}$ | 7.752 |
| 207 | 0.950 | 0.070 | 0.700 | 0.250 | 0.050 | 980 | 16840 | −32.1 | −65.3 | 32 | $1.0 \times 10^{+14}$ | 8.116 |
| 208* | 0.950 | 0.350 | 0.700 | 0.250 | 0.050 | 950 | 4860 | −63.2 | −32.1 | 421 | $1.6 \times 10^{+12}$ | 7.985 |
| 209 | 1.035 | 0.025 | 0.700 | 0.250 | 0.050 | 920 | 20650 | −50.6 | −50.3 | 215 | $8.5 \times 10^{+13}$ | 8.154 |
| 210* | 1.035 | 0.250 | 0.700 | 0.250 | 0.050 | 880 | 4180 | +21.3 | −42.5 | 23 | $4.0 \times 10^{+12}$ | 7.798 |
| 211* | 1.000 | 0.000 | 0.450 | 0.400 | 0.150 | 1080 | 9520 | −85.4 | −15.2 | 542 | $2.0 \times 10^{+9}$ | 7.554 |
| 212 | 1.015 | 0.001 | 0.450 | 0.400 | 0.150 | 1000 | 10230 | −78.3 | −22.4 | 512 | $3.5 \times 10^{+12}$ | 7.985 |
| 213 | 1.015 | 0.025 | 0.450 | 0.400 | 0.150 | 920 | 11560 | −56.3 | −41.3 | 224 | $1.5 \times 10^{+13}$ | 8.087 |
| 214 | 1.000 | 0.075 | 0.450 | 0.400 | 0.150 | 900 | 11650 | −41.3 | −52.3 | 42 | $4.5 \times 10^{+13}$ | 8.102 |
| 215* | 1.000 | 0.275 | 0.450 | 0.400 | 0.150 | 880 | 2350 | +12.0 | −42.3 | 145 | $1.5 \times 10^{+12}$ | 7.795 |
| 216 | 1.015 | 0.025 | 0.950 | 0.049 | 0.001 | 920 | 11860 | −22.3 | −82.5 | 163 | $5.0 \times 10^{+12}$ | 7.858 |
| 217 | 1.015 | 0.025 | 0.750 | 0.249 | 0.001 | 920 | 8560 | −85.3 | −12.6 | 482 | $3.5 \times 10^{+12}$ | 7.985 |
| 218 | 1.015 | 0.025 | 0.010 | 0.800 | 0.190 | 880 | 4030 | −52.1 | −5.3 | 662 | $2.5 \times 10^{+12}$ | 7.854 |
| 219 | 1.015 | 0.025 | 0.010 | 0.450 | 0.540 | 850 | 4250 | +0.8 | −41.3 | 88 | $5.0 \times 10^{+12}$ | 7.965 |
| 220 | 1.015 | 0.025 | 0.900 | 0.050 | 0.050 | 900 | 11280 | −22.3 | −82.9 | 41 | $4.5 \times 10^{+12}$ | 8.085 |
| 221* | 1.015 | 0.025 | 0.300 | 0.650 | 0.050 | 950 | 1950 | −32.5 | +15.3 | 253 | $1.5 \times 10^{+12}$ | 8.025 |
| 222* | 1.015 | 0.025 | 0.300 | 0.250 | 0.450 | 900 | 1480 | +12.3 | −45.6 | 554 | $2.5 \times 10^{+12}$ | 8.152 |

(1) Basic compositions: $Pb_aCa_b(Mg_{\frac{1}{3}}Nb_{\frac{2}{3}})_xTi_y(Ni_{\frac{1}{2}}W_{\frac{1}{2}})_zO_{2+a+b}$
(2) Compositions of the Nos. with asterisk (*) are outside of the scope of the present invention.

The reasons for limitations of values in TABLE 2 and values <a> and <a+b> are as follows:

In case of the compositions wherein proportion x, y and z are out of the polygon FGHIJ such as sample Nos. 221 and 222, the dielectric constant is lower than 3500 and the temperature coefficient of the dielectric constant is large. In case of the compositions wherein b is smaller than 0.001 and a+b is smaller than 1.00 such as sample Nos. 201, 206, and 211, the electrical resistivity are lower than $1.0 \times 10^{10}$ Ω·cm. In case of the compo-

TABLE 3

| No. | Composition a | b | x | y | z | Sintering temperature (°C.) | ε (20° C.) | Change of ε (−25° C.) % | Change of ε (85° C.) % | tan δ (20° C.) × $10^{-4}$ | Specific resistivity (20° C.) Ω·cm | Density g/cm³ |
|---|---|---|---|---|---|---|---|---|---|---|---|---|
| 301* | 1.000 | 0.000 | 0.700 | 0.250 | 0.050 | 1120 | 15390 | −72.6 | −50.1 | 412 | $1.5 \times 10^{+9}$ | 7.661 |
| 302 | 1.000 | 0.001 | 0.700 | 0.250 | 0.050 | 1050 | 16410 | −70.3 | −50.5 | 412 | $1.5 \times 10^{+11}$ | 7.891 |
| 303 | 1.000 | 0.025 | 0.700 | 0.250 | 0.050 | 990 | 18660 | −41.3 | −61.2 | 111 | $5.0 \times 10^{+13}$ | 8.005 |
| 304 | 1.000 | 0.200 | 0.700 | 0.250 | 0.050 | 920 | 12260 | −11.2 | −78.6 | 52 | $1.0 \times 10^{+13}$ | 7.923 |
| 305* | 1.000 | 0.400 | 0.700 | 0.250 | 0.050 | 950 | 4250 | +25.3 | −98.3 | 585 | $1.2 \times 10^{+11}$ | 7.655 |
| 306* | 0.950 | 0.030 | 0.700 | 0.250 | 0.050 | 1180 | 13200 | −54.6 | −92.6 | 445 | $1.5 \times 10^{+8}$ | 7.521 |
| 307 | 0.950 | 0.070 | 0.700 | 0.250 | 0.050 | 1020 | 14150 | −41.8 | −72.2 | 25 | $1.5 \times 10^{+13}$ | 8.008 |
| 308* | 0.950 | 0.350 | 0.700 | 0.250 | 0.050 | 980 | 3820 | −70.0 | −41.2 | 552 | $1.0 \times 10^{+11}$ | 7.885 |
| 309 | 1.035 | 0.025 | 0.700 | 0.250 | 0.050 | 950 | 17450 | −45.3 | −51.2 | 125 | $6.0 \times 10^{+13}$ | 8.022 |
| 310* | 1.035 | 0.200 | 0.700 | 0.250 | 0.050 | 880 | 3820 | +11.7 | −78.6 | 42 | $1.0 \times 10^{+11}$ | 7.665 |
| 311* | 1.000 | 0.000 | 0.450 | 0.400 | 0.150 | 1080 | 9520 | −85.4 | −15.2 | 542 | $2.0 \times 10^{+9}$ | 7.554 |
| 312 | 1.015 | 0.001 | 0.450 | 0.400 | 0.150 | 1000 | 10450 | −76.2 | −21.4 | 458 | $3.5 \times 10^{+12}$ | 7.885 |
| 313 | 1.015 | 0.025 | 0.450 | 0.400 | 0.150 | 940 | 10060 | −43.5 | −31.2 | 123 | $1.0 \times 10^{+12}$ | 8.002 |
| 314 | 1.000 | 0.075 | 0.450 | 0.400 | 0.150 | 920 | 10020 | −32.2 | −62.3 | 33 | $1.0 \times 10^{+13}$ | 8.025 |
| 315* | 1.000 | 0.220 | 0.450 | 0.400 | 0.150 | 900 | 1890 | +11.2 | −52.3 | 285 | $5.0 \times 10^{+11}$ | 7.662 |
| 316 | 1.015 | 0.025 | 0.950 | 0.049 | 0.001 | 950 | 12100 | −22.5 | −75.5 | 102 | $4.0 \times 10^{+12}$ | 7.855 |
| 317 | 1.015 | 0.025 | 0.750 | 0.249 | 0.001 | 950 | 7250 | −80.2 | −11.2 | 552 | $1.2 \times 10^{+12}$ | 7.855 |
| 318 | 1.015 | 0.025 | 0.010 | 0.800 | 0.190 | 900 | 3880 | −54.2 | −9.6 | 452 | $1.5 \times 10^{+12}$ | 7.885 |
| 319 | 1.015 | 0.025 | 0.010 | 0.450 | 0.540 | 880 | 3860 | +12.2 | −51.2 | 11 | $2.2 \times 10^{+12}$ | 7.585 |
| 320 | 1.015 | 0.025 | 0.900 | 0.050 | 0.050 | 920 | 10220 | −20.2 | −79.3 | 22 | $3.0 \times 10^{+12}$ | 7.951 |
| 321* | 1.015 | 0.025 | 0.300 | 0.650 | 0.050 | 980 | 1560 | −21.2 | +11.2 | 452 | $6.0 \times 10^{+10}$ | 8.001 |

TABLE 3-continued

| No. | Composition | | | | | Sintering temperature (°C.) | ε (20° C.) | Change of ε | | tan δ (20° C.) × 10⁻⁴ | Specific resistivity (20° C.) Ω · cm | Density g/cm³ |
|---|---|---|---|---|---|---|---|---|---|---|---|---|
| | a | b | x | y | z | | | (−25° C.) % | (85° C.) % | | | |
| 322* | 1.015 | 0.025 | 0.300 | 0.250 | 0.450 | 920 | 1120 | +22.3 | −51.2 | 455 | 1.2 × 10⁺¹¹ | 8.055 |

(1) Basic compositions: $Pb_aBa_b(Mg_{\frac{1}{3}}Nb_{\frac{2}{3}})_xTi_y(Ni_{\frac{1}{2}}W_{\frac{1}{2}})_zO_{2+a+b}$
(2) Compositions of the Nos. with asterisk (*) are outside of the scope of the present invention.

From TABLE 3 it is obvious that ceramic compositions which fall within the polygon KLMNO in the ternary system composition diagram of FIG. 3 and in which $0.001 \leq b \leq 0.200$ and $1.001 \leq a+b \leq 1.200$ provide a high dielectric constant ($\epsilon = 18660$ to $3860$), and high electrical resistivity up to $1.0 \times 10^{10}$ Ω.cm, low dielectric loss and low temperature coefficient of the dielectric constant, and can be sintered below 1080° C.

K, L, M, N and O of FIG. 3. are represented by the values of x, y and z as follows:

| | x | y | z |
|---|---|---|---|
| K: | 0.950 | 0.049 | 0.001 |
| L: | 0.750 | 0.249 | 0.001 |
| M: | 0.010 | 0.800 | 0.190 |
| N: | 0.010 | 0.045 | 0.540 |
| O: | 0.900 | 0.050 | 0.050 |

The reasons for limitations of values in TABLE 3 and values $<a>$ and $<a+b>$ are as follows:

In case of the compositions wherein proportion x, y and z are out of the polygon FGHIJ such as sample Nos. 321 and 322, the dielectric constant is lower than 3500 and the temperature coefficient of the dielectric constant is large. In case of the compositions wherein b is smaller than 0.001 and a+b is smaller than 1.00 such as sample Nos. 301, 306 and 311, the electrical resistivity is lower than $1.0 \times 10^{10}$ Ω.cm. In case of the composition wherein b is larger than 0.250 and a+b is larger than 1.200 such as sample Nos. 305, 308, 310 and 315, the dielectric constants are decreased or dielectric loss is increased.

EXAMPLE 4

The starting materials, viz. lead oxide (PbO), titanium oxide (TiO₂), niobium oxide (Nb₂O₅), magnesium oxide (MgO), nickel oxide (NiO), tungsten oxide (WO₃), and strontium carbonate (SrCO₃), all relatively pure grade, were initially mixed in a ball mill with distilled water and calcium oxide stabilised zirconia balls for 17 hours. The following powder process, the sintered process and measuring of properties of sintering body were the same as those in Example 1.

Various properties of the ceramic disks thus obtained are shown in TABLE 4.

From TABLE 4 it is obvious that ceramic compositions within the polygon PQRS in the ternary system compositions diagram of FIG. 4 and in which $0.001 \leq b \leq 0.225$ and $1.001 \leq a+b \leq 1.240$ provide a high dielectric constant ($\epsilon = 16630$ to $4010$), high electrical resistivity up to $1.0 \times 10^{10}$ Ω.cm, low dielectric loss and low temperature coefficient of the dielectric constant, and can be sintered below 1080° C.

TABLE 4

| No. | Composition | | | | | Sintering temperature (°C.) | ε (20° C.) | Change of ε | | tan δ (20° C.) × 10⁻⁴ | Specific resistivity (20° C.) Ω · cm | Density g/cm³ |
|---|---|---|---|---|---|---|---|---|---|---|---|---|
| | a | b | x | y | z | | | (−25° C.) % | (85° C.) % | | | |
| 401* | 1.000 | 0.000 | 0.700 | 0.250 | 0.050 | 1120 | 15390 | −72.6 | −50.1 | 412 | 1.5 × 10⁺⁹ | 7.661 |
| 402 | 1.000 | 0.001 | 0.700 | 0.250 | 0.050 | 1050 | 16630 | −71.2 | −51.2 | 402 | 3.0 × 10⁺¹¹ | 7.884 |
| 403 | 1.000 | 0.025 | 0.700 | 0.250 | 0.050 | 1000 | 15320 | −45.3 | −42.2 | 125 | 7.5 × 10⁺¹³ | 8.023 |
| 404 | 1.000 | 0.225 | 0.700 | 0.250 | 0.050 | 920 | 8520 | −15.2 | −72.3 | 32 | 1.0 × 10⁺¹³ | 7.855 |
| 405* | 1.000 | 0.400 | 0.700 | 0.250 | 0.050 | 1000 | 5220 | +20.3 | −65.3 | 225 | 1.5 × 10⁺¹² | 7.325 |
| 406* | 0.950 | 0.030 | 0.700 | 0.250 | 0.050 | 1150 | 12350 | −42.3 | −35.6 | 225 | 7.5 × 10⁺¹⁰ | 7.215 |
| 407 | 0.950 | 0.070 | 0.700 | 0.250 | 0.050 | 1000 | 11520 | −40.2 | −45.3 | 125 | 1.5 × 10⁺¹⁴ | 8.002 |
| 408* | 0.950 | 0.350 | 0.700 | 0.250 | 0.050 | 1080 | 2560 | −24.2 | −75.3 | 542 | 5.2 × 10⁺¹³ | 7.252 |
| 409 | 1.035 | 0.025 | 0.700 | 0.250 | 0.050 | 980 | 11560 | −45.2 | −42.3 | 45 | 9.0 × 10⁺¹³ | 8.088 |
| 410* | 1.035 | 0.250 | 0.700 | 0.250 | 0.050 | 880 | 1980 | +32.1 | −31.2 | 14 | 7.0 × 10⁺¹² | 7.425 |
| 411* | 1.000 | 0.000 | 0.450 | 0.400 | 0.150 | 1080 | 9520 | −85.4 | −15.2 | 542 | 2.0 × 10⁺⁹ | 7.554 |
| 412 | 1.015 | 0.001 | 0.450 | 0.400 | 0.150 | 1000 | 10020 | −74.3 | −22.5 | 458 | 7.2 × 10⁺¹² | 7.985 |
| 413 | 1.015 | 0.025 | 0.450 | 0.400 | 0.150 | 970 | 9520 | −42.3 | −38.5 | 114 | 1.0 × 10⁺¹³ | 8.002 |
| 414 | 1.000 | 0.075 | 0.450 | 0.400 | 0.150 | 950 | 8560 | −33.2 | −65.2 | 52 | 3.0 × 10⁺¹³ | 7.988 |
| 415* | 1.000 | 0.275 | 0.450 | 0.400 | 0.150 | 900 | 2850 | +25.3 | −55.9 | 78 | 2.6 × 10⁺¹² | 7.668 |
| 416 | 1.015 | 0.030 | 0.950 | 0.049 | 0.001 | 970 | 10580 | −20.3 | −79.6 | 88 | 7.0 × 10⁺¹² | 7.756 |
| 417 | 1.015 | 0.150 | 0.400 | 0.591 | 0.001 | 1050 | 4990 | −77.3 | −5.3 | 851 | 2.0 × 10⁺¹² | 7.668 |
| 418 | 1.015 | 0.200 | 0.001 | 0.900 | 0.099 | 1000 | 4000 | −42.6 | −8.9 | 775 | 1.5 × 10⁺¹² | 7.566 |
| 419 | 1.015 | 0.025 | 0.001 | 0.600 | 0.399 | 980 | 4010 | +5.6 | −22.1 | 115 | 2.5 × 10⁺¹² | 7.558 |
| 420 | 1.015 | 0.225 | 0.150 | 0.825 | 0.025 | 1000 | 1420 | −42.1 | +22.3 | 336 | 2.5 × 10⁺¹² | 7.789 |
| 421* | 1.015 | 0.025 | 0.150 | 0.350 | 0.500 | 980 | 2150 | −1.23 | −52.1 | 335 | 1.3 × 10⁺¹² | 8.002 |

(1) Basic compositions: $Pb_aSr_b(Mg_{\frac{1}{3}}Nb_{\frac{2}{3}})_xTi_y(Ni_{\frac{1}{2}}W_{\frac{1}{2}})_zO_{2+a+b}$
(2) Compositions of the Nos. with asterisk (*) are outside of the scope of the present invention.

Figure 4:
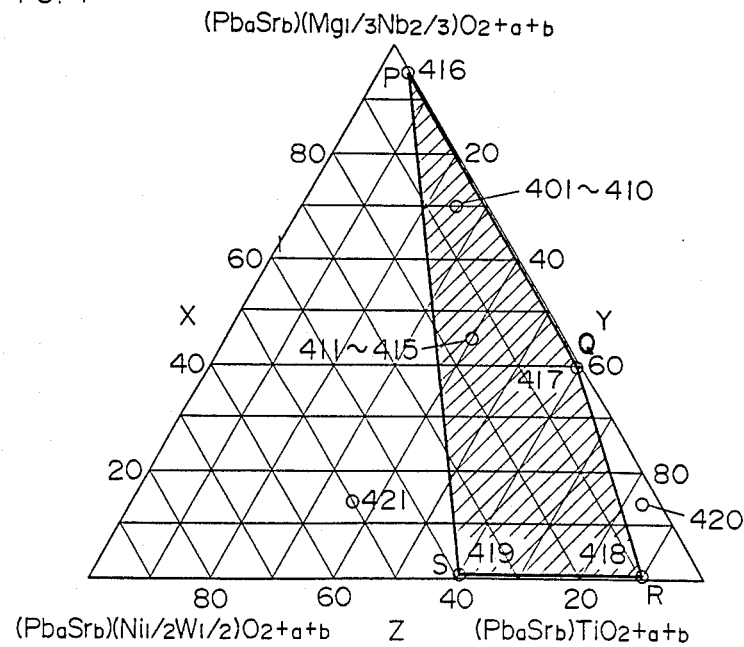
FIG. 4 is a composition diagram of $Pb_aSr_bTiO_{2+a+b}$-$Pb_aSr_b$-$(Mg_{\frac{1}{3}}Nb_{\frac{2}{3}})O_{2+a+b}$-$Pb_aSr_b(Ni_{\frac{1}{2}}W_{\frac{1}{2}})O_{2+a+b}$ ternary system composition in accordance with the present invention.

P, Q, R and S of FIG. 4 are represented by the values of x, y and z as follows:

| | x | y | z |
|---|---|---|---|
| P: | 0.950 | 0.049 | 0.001 |
| Q: | 0.400 | 0.591 | 0.001 |
| R: | 0.001 | 0.900 | 0.099 |
| S: | 0.001 | 0.600 | 0.399 |

The reasons for limitations of values in FIG. 4 and values $<a>$ and $<a+b>$ are as follows:

In case of the compositions wherein proportion x, y and z is out of the polygon PQRS such as sample Nos. 320 and 321, the dielectric constant is lower than 3500 and the temperature coefficient of the dielectric constant is large. In case of the compositions wherein b is smaller than 0.001 and a+b is smaller than 1.00 such as sample Nos. 301, 306 and 311, the electrical resistivity is lower than $1.0 \times 10^{10} \Omega \cdot cm$. In case of the composition wherein b is larger than 0.250 and a+b is larger than 1.200 such as sample Nos. 305, 308, 310 and 315, the dielectric constants are decreased or dielectric loss are increased.

As apparent from these Examples 1 to 4, the ternary ceramic compositions according to the present invention can be sintered below 1100° C., and in low partial pressure of oxygen atmosphere, at which temperature and atmosphere the copper metal internal electrode is not melted and oxidized, and exhibit high dielectric constant, high electrical resistivity, low dielectric loss and low temperature coefficient of dielectric constant. Therefore copper metal can be used as internal electrodes of multi-layer ceramic capacitors, employing compositions according to this invention as dielectric materials.

It will be evident that the starting materials to be used in the present invention are not limited to those used in the above examples. Other oxides or compounds which are easily decomposed at elevated temperature may be used in place of the starting materials of the above examples.

What is claimed is:

1. A ceramic composition consisting essentially of a material represented by the formula $$Pb_a(Mg_{\frac{1}{3}}Nb_{\frac{2}{3}})_x Ti_y (Ni_{\frac{1}{2}}W_{\frac{1}{2}})_z O_{2+a}$$

wherein subscripts a, x, y and z represent molar fractions of the respective components, $x+y+z=1$ and $1.001 \leq a \leq 1.110$, said composition falling within a polygonal area defined by the points A, B, C, D and E in FIG. 1.

2. A ceramic composition consisting essentially of a material represented by the formula $$Pb_a Ca_b (Mg_{\frac{1}{3}}Nb_{\frac{2}{3}})_x Ti_y (Ni_{\frac{1}{2}}W_{\frac{1}{2}})_z O_{2+a+b}$$

wherein subscripts a, b, x, y and z represent molar fractions of the respective components, $x+y+z=1$, $1.001 \leq a+b \leq 1.225$, and $0.001 \leq b \leq 0.225$, said composition falling within a polygonal area defined by the points F, G, H, I and J in FIG. 2.

Figure 3:
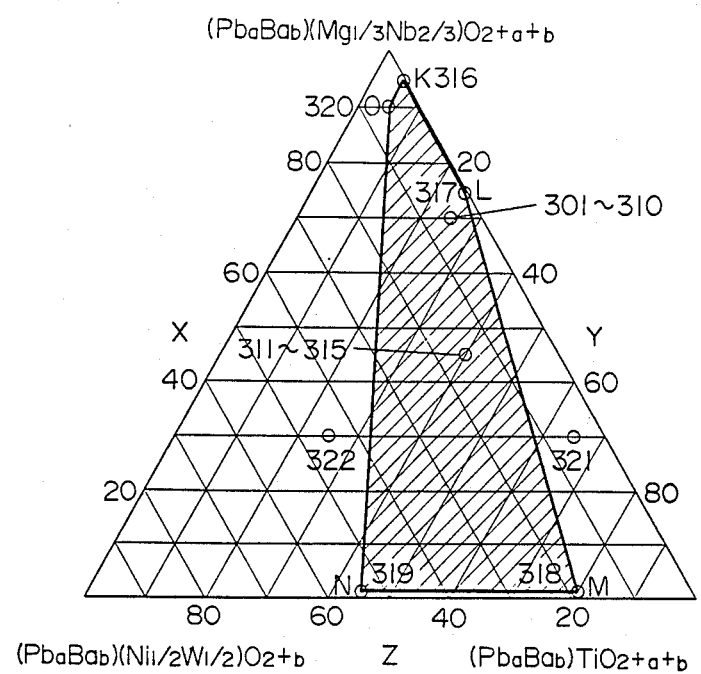
FIG. 3 is a composition diagram of $Pb_aBa_bTiO_{2+a+b}$-$Pb_aBa_b$-$(Mg_{\frac{1}{3}}Nb_{\frac{2}{3}})O_{2+a+b}$-$Pb_aBa_b$-$(Ni_{\frac{1}{2}}W_{\frac{1}{2}})O_{2+a+b}$ ternary system composition in accordance with the present invention.

3. A ceramic composition consisting essentially of a material represented by the formula $$Pb_a Ba_b (Mg_{\frac{1}{3}}Nb_{\frac{2}{3}})_x Ti_y (Ni_{\frac{1}{2}}W_{\frac{1}{2}})_z O_{2+a+b}$$

wherein subscripts a, b, x, y and z represent molar fractions of the respective components, $x+y+z=1$, $1.001 \leq a+b \leq 1.200$, and $0.001 \leq b \leq 0.200$, said composition falling within a polygonal area defined by the points K, L, M, N and O in FIG. 3.

4. A ceramic composition consisting essentially of a material replesented by the formula $$Pb_a Sr_b (Mg_{\frac{1}{3}}Nb_{\frac{2}{3}})_x Ti_y (Ni_{\frac{1}{2}}W_{\frac{1}{2}})_z O_{2+a+b}$$

wherein subscripts a, b, x, y and z represent molar fractions of the respective components, $x+y+z=1$, $1.001 \leq a+b \leq 1.240$, and $0.001 \leq b \leq 0.225$, said composition falling within a polygonal area defined by the points P, Q, R and S in FIG. 4.

* * * * *